United States Patent [19]

Huang et al.

[11] Patent Number: 5,681,875
[45] Date of Patent: Oct. 28, 1997

[54] PROCESS FOR MAKING FLAME RETARDANT THERMOPLASTIC COMPOSITIONS UTILIZING TETRAFLUOROETHYLENE POLYMER

[75] Inventors: Jianing Huang; Fuh-Sheng Fred Chen, both of Parkersburg, W. Va.; Jacobus Johannes Maria Brasser, Noord Scharwoude, Netherlands

[73] Assignee: General Electric Company, Pittsfield, Mass.

[21] Appl. No.: 589,520

[22] Filed: Jan. 22, 1996

Related U.S. Application Data

[63] Continuation of Ser. No. 324,959, Oct. 18, 1994, abandoned.
[51] Int. Cl.$^6$ .............................. C08K 5/06; C08K 27/18
[52] U.S. Cl. ..................... 523/351; 524/373; 524/371; 525/72; 525/199
[58] Field of Search .................... 523/351, 334, 523/206, 331; 525/197, 198, 199, 72; 524/546, 411, 412, 371, 373, 94

[56] References Cited

U.S. PATENT DOCUMENTS

| | | | |
|---|---|---|---|
| 3,005,795 | 10/1961 | Busse et al. | 525/199 |
| 3,294,871 | 12/1966 | Schmitt et al. | 525/199 |
| 4,107,232 | 8/1978 | Haaf | 260/876 |
| 4,355,126 | 10/1982 | Haaf et al. | 524/341 |
| 4,579,906 | 4/1986 | Zabrocki et al. | 524/412 |
| 4,639,486 | 1/1987 | Liu | 524/412 |
| 4,716,196 | 12/1987 | Hilton et al. | 525/72 |
| 4,767,821 | 8/1988 | Lindner et al. | 525/72 |
| 4,810,739 | 3/1989 | Lindner et al. | 524/412 |
| 4,945,126 | 7/1990 | Crosby et al. | 525/199 |
| 5,013,792 | 5/1991 | Chapman et al. | 525/199 |
| 5,200,454 | 4/1993 | Nakano et al. | 524/412 |
| 5,218,017 | 6/1993 | Doucet et al. | 525/72 |
| 5,248,718 | 9/1993 | Fasulo et al. | 524/341 |
| 5,539,036 | 7/1996 | Fong et al. | 524/411 |

*Primary Examiner*—Veronica P. Hoke

[57] ABSTRACT

A process is provided for making a flame composition. The process involves (a) mechanically dry blending (i) a tetrafluoroethylene polymer, preferably in powder form, and (ii) a first thermoplastic resin, preferably a vinyl aromatic resin to form a preblend composition and (b) admixing the preblend composition with a thermoplastic resin and a flame retardant to form the thermoplastic resin. The process provides enhanced levels of falling dart impact strength in articles molded from the thermoplastic composition.

13 Claims, No Drawings

PROCESS FOR MAKING FLAME RETARDANT THERMOPLASTIC COMPOSITIONS UTILIZING TETRAFLUOROETHYLENE POLYMER

This is a continuation of application Ser. No. 08/324,959 filed on Oct. 18, 1994, now abandoned.

BACKGROUND OF THE INVENTION

1. Field of the Invention

The present invention relates to thermoplastic compositions and processes, and more particularly relates to thermoplastic compositions containing tetrafluoroethylene, and process for making thereof.

2. Description of the Related Art

Polytetrafluoroethylene polymers and their use as drip suppressants in flame retardant thermoplastic compositions are generally known, see Liu, U.S. Pat. No. 4,639,486, issued Jan. 27, 1987, Haaf et al., U.S. Pat. No. 4,107,232, issued Aug. 15, 1978, Zabrocki et al., U.S. Pat. No. 4,579,906, issued Apr. 1, 1986, and Lindner et al., U.S. Pat. No. 4,810,739, issued Mar. 7, 1989, all of which are incorporated herein by reference. Vinyl aromatic thermoplastic compositions utilizing such polytetrafluoroethylene (PTFE) polymers, however, have typically suffered from one or more of the following problems (a) less than desired levels of impact strength or (b) fibrillization of the PTFE material resulting in the PTFE being undesirably visible at the surface of molded parts resulting in poor surface appearance. Prior blending processes have included blending processes which have included blending of a PTFE latex with an ABS emulsion, followed by breaking the emulsion via acid coagulation or high shear spraying, but such processes have undesirably utilized high water levels (for example, greater than 50 percent by weight water) requiring substantial drying and have undesirably required a coagulation step involving acid or have utilized high shear to break the emulsion of the blend.

Accordingly, there is a need to provide a process for making a thermoplastic composition utilizing a polytetrafluoroethylene polymer which exhibits improved impact strength, no detectable fibrillized PTFE and good mold surfaces.

SUMMARY OF THE INVENTION

The process of the present invention involves making a flame retardant thermoplastic composition by blending (a) a first thermoplastic resin and (b) a tetrafluoroethylene polymer to form a preblend composition. The preblend may then be admixed with a second thermoplastic resin and a flame retardant to produce the thermoplastic resin composition. The thermoplastic resin composition is useful for making molded components such as parts for printer housings, computer housings and power tool housings.

DETAILED DESCRIPTION OF THE INVENTION

The process for making a flame retardant thermoplastic composition involves (a) blending (preferably dry blending) (i) a first thermoplastic resin and (ii) a tetrafluoroethylene polymer to form a tetrafluoroethylene polymer preblend composition, and then (b) admixing the preblend with a second thermoplastic resin and a flame retardant to form the flame retardant thermoplastic composition. The first and second thermoplastic resins are not fluoropolymers, and they are preferably both vinyl aromatic polymers. The blending of step (a) is preferably done under low shear such as by a can type shaker wherein the ingredients (preferably in powder form) are blended by merely shaking the ingredients together. Alternatively the blending may be achieved by spraying a latex of tetrafluoroethylene polymer onto particles of the first thermoplastic resin followed by drying thereof to form a preblend in the form of dry tetrafluoroethylene polymer coated first thermoplastic resin particles. Further, the blending may be achieved by blending a latex of tetrafluoroethylene polymer with the first thermoplastic resin to produce a preblend containing less than 10 percent by weight water, preferably less than 5 percent by weight water, and most preferably less than 1 percent by weight water based on the total weight of the preblend optionally followed by briefly drying (or without drying) of the preblend.

The preblend composition preferably comprises the first thermoplastic resin at a level of 50 to 99.99 percent by weight based on the total weight of the preblend composition, more preferably from 75 to 99.9 percent by weight thereof, and most preferably from 99 to 99.5 percent by weight thereof; the preblend preferably comprises the polytetrafluoroethylene at a level of from 0.01 to 50 weight percent based on the total weight of the preblend composition, more preferably from 0.1 to 25 percent by weight thereof, and most preferably from 0.5 to 20 percent by weight thereof.

The preblend is then admixed with a second thermoplastic resin and a flame retardant to produce the flame retardant thermoplastic composition. The preblend and thermoplastic resin are preferably admixed in a respective weight ratio of between 1:1 and 1:500, more preferably between 1:10 and 1:100, and most preferably between 1:25 and 1:200.

The flame retardant thermoplastic composition preferably comprises the combined first and second thermoplastic resin at a level of from 50 to 98 percent by weight based on the total weight of the thermoplastic composition, more preferably from 60 to 90 percent by weight thereof. The flame retardant thermoplastic composition preferably comprises the flame retardant at a level of from 5 to 40 percent by weight based on the total weight of the composition, more preferably from 10 to 30 percent by weight thereof, and most preferably from 15 to 25 percent by weight thereof.

The first and second thermoplastic resins are each preferably a vinyl aromatic resin, and more preferably a rubber modified monovinylidene aromatic resin comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co) polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

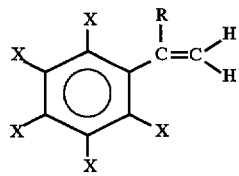

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth) acrylates, hydroxy alkyl (meth) acrylates or mixtures thereof. The acrylonitrile, substituted acrylonitrile, or acrylic acid esters are described generically by the following formula:

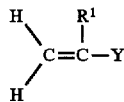

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 5 to 85 percent by weight based on the total weight of the graft copolymer, more preferably from 10 to 80 percent by weight thereof, and most preferably 20 to 70 percent by weight thereof; and the rigid superstrate is preferably present at a level of from 15 to 95 percent by weight based on the total weight of the graft copolymer, more preferably from 20 to 90 percent by weight thereof, and most preferably from 30 to 80 percent by weight thereof.

For high rubber graft emulsion resins, the rubber level will range from 50 to 85% by weight based on the total weight of the rubber modified resin. For mass polymerization, the rubber level ranges from 4 to 40% by weight based on the total weight of the rubber modified resin. For blends of an ungrafted rigid copolymer (such as styreneacrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth) acrylates, polyester di(meth) acrylates, divinylbenzene, trivinylbenzene, butadiene, isoprene and optionally graftable monomers such as, triallyl cyanurate, triallyl isocyanurate, allyl (meth) acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycolbis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

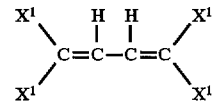

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic fractionation (CHDF) may be described as having an average particle size by weight of select one of the following: 0.05 to 1.2 microns, preferably .2 to .8 microns, for emulsion based polymerized rubber latices or 0.5 to 10 microns, preferably 0.6 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$–$C_6$ alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The ungrafted rigid polymers (typically free of rubber) are resinous, thermoplastic polymers of styrene, α-methylstyrene, styrenes substituted in the nucleus such as p-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred.

The ungrafted rigid copolymers are known and may be prepared by radical polymerisation, in particular by emulsion, suspension, solution or bulk polymerisation. They preferably have number average molecular weights of from 20,000 to 200,000.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

The first and second thermoplastic resins may also contain amounts of a resin such as an aromatic polycarbonate resin, a polybutylene terephthalate resin or a polyphenylene ether resin. The vinyl aromatic resin may also be a polystyrene or a rubber modified polystyrene. The first and second thermoplastic resins are preferably in the form of dry particulates.

Tetrafluoroethylene polymers which are suitable according to the invention have fluorine contents of 65–76% by weight, preferably 70–76% by weight. Examples are polytetrafluoroethylene, tetrafluoroethylene/hexafluoropropylene copolymers, tetrafluoroethylene/1,1-difluoroethylene copolymers, and tetrafluoroethylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluorpolymers", Wiley-Interscience, New York, 1972; "Encyclopedia of Polymer Science and Technology", interscience Publishers, New York, Volume 13, 1970, pages 623–654; "Modern Plastics Encyclopedia", 1970–1971, Volume 47, No. 10 A, October 1970 McGraw-Hill, Inc., New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092. The tetrafluoroethylene polymers are preferably in the form of a powder or latex. The latex form generally contains from 30 to 50 percent by weight water ($H_2O$), and from 50 to 70 percent by weight tetrafluoroethylene polymer particles.

A preferred flame retardant is tetrabromo bisphenol A. The usual flameproofing additives, in particular low molecular weight bromine compounds, can be used as the organic halogen compounds. Examples are octabromodiphenyl ethers, tribromophenol, tetrabromophthalimide, tribromophenoxymethane, bis(tribromophenoxy)ethane, tris (tribromophenyl) triphosphate, trichlorotetrabromotoluene, hexabromocyclododecane and decabromodiphenyl ether.

The flame retardant thermoplastic composition may contain various other components such as flame retardant synergists (enhancing agents) such as oxides and halides of groups IV-A and V-A of the periodic table; organic or inorganic compounds of phosphorous, nitrogen, boron or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Examples of suitable synergists include $Sb_2O_3$ (antimony trioxide), $Sb_2(CO_3)_3$, $Bi_2O_3$ and $Bi_2(CO_3)_3$, and may be present in various amounts such as 0 to 15% by weight based on the total weight of the flame retardant thermoplastic composition more preferably from 0.1 to 15%, even more preferably 2 to 10%, and most preferably 3 to 6 percent by weight thereof.

The scope of the present invention includes the incorporation of other additives in the composition so far as to produce a particular end result. Such additives include, without limitation, heat stabilizers, light stabilizers, plasticizers, pigments, preservatives, ultraviolet light stabilizers, fillers, antioxidants, antistatic agents and other materials well known to those skilled in the art, for example, as described in Modern Plastics Encyclopedia, Vol. 63, No. 10A, McGraw-Hill, Inc. (1986).

TABLE 1

|  | A | 1 |
|---|---|---|
| ABS 1 | 100 | 100 |
| Antimony Oxide | 5 | 5 |
| OBDPO | 20 | 20 |
| PTFE powder | 0.07 |  |
| 3% PTFE/ABS2 |  | 2.33 |
| Physical Properties |  |  |
| Izod Impact (ft-lb/in) | 3.1 | 3.4 |
| Gardner Dart Impact |  |  |
| M.F.E. (ft-lb) | 10.8 | 16.4 |
| St. Dev. | 4.0 | 1.7 |
| Flame test |  |  |
| UL94-V0 rating (.060") | V-0 | V-0 |
| -5V rating (.090") | 5V | 5V |
| Melt Viscosity @450° F. |  |  |
| 100/sec. | 12419 | 12676 |
| 500/sec. | 4262 | 4358 |
| 1000/sec. | 2689 | 2752 |

OBDPO is octabromodiphenyloxide.
ABS is an acrylonitrile-butadiene-styrene graft copolymer.
HRG is an acrylonitrile-butadiene-styrene graft copolymer.

TABLE 2

|  | B | 2 |
|---|---|---|
| SAN 1 | 49.9 | 49.9 |
| ABS 3 | 50.1 | 50.1 |
| TBBPA | 13 | 13 |
| Br-Epoxy | 11 | 11 |
| Antimony oxide | 9 | 9 |
| PTFE powder | 0.1 |  |
| 3% PTFE/ABS 2 |  | 3.5 |
| Physical properties |  |  |
| Izod Impact (ft-lb/in) | 3.4 | 3.7 |
| Gardner Dart Impact |  |  |
| M.F.E. (ft-lb) | 8.25 | 15.00 |
| Melt Viscosity @400° F. |  |  |
| 100/sec. | 11312 | 11382 |
| 500/sec. | 4094 | 4065 |
| 1000/sec. | 2643 | 2609 |

TABLE 3

|  | C | 3 | 4 | 5 | 6 |
|---|---|---|---|---|---|
| ABS 1 | 100 | 100 | 100 | 100 | 100 |
| Antimony Oxide | 5 | 5 | 5 | 5 | 5 |
| OBDPO | 20 | 20 | 20 | 20 | 20 |
| PTFE | 0.07 |  |  |  |  |
| 3% PTFE/HRG |  | 2.3 |  |  |  |
| 5% PTFE/HRG (w/o drying) |  |  | 1.4 |  |  |
| 5% PTFE/HRG |  |  |  | 1.4 |  |
| 10% PTFE/HRG (w/o drying) |  |  |  |  | 0.74 |
| Physical properties |  |  |  |  |  |
| Izod impact (ft-lb/in) | 3.1 | 3.2 | 3.1 | 2.9 | 3.0 |
| Gardner Dart impact |  |  |  |  |  |
| M.F.E. (ft-lb) | 9.20 | 14.00 | 12.40 | 14.43 | 13.86 |
| St. Dev. | 2.33 | 1.71 | 1.42 | 2.61 | 2.74 |
| UL94-V0 (.060") rating | V-0 | V-0 | V-0 | V-0 | V-0 |
| UL94-5V (.125") | 5V | 5V | 5V | 5V | 5V |

TABLE 4

|  | D | E | F | 7 | 8 | 9 |
|---|---|---|---|---|---|---|
| SAN 1 | 50 | → | → | → | → | → |
| ABS 4 | 50 | → | → | → | → | → |
| TBBP-A | 13 | → | → | → | → | → |
| Brominated Epoxy | 11 | → | → | → | → | → |
| Sb2O3 | 7 | → | → | → | → | → |
| PTFE powder | 0.15 | 0.18 | 0.20 |  |  |  |
| 10% PTFE/E-SAN |  |  |  | 1.5 | 1.8 | 2.0 |
| Gardner Dart Impact |  |  |  |  |  |  |
| M.F.E. (ft-lb) | 7.86 | 8.25 | 6.25 | 15.00 | 13.75 | 20.71 |
| St. Dev. | 1.81 | 0.85 | 0.85 | 5.65 | 4.09 | 5.12 |
| Izod Impact (ft-lb/in) | 3.7 | 3.5 | 3.6 | 3.5 | 3.5 | 3.6 |
| UL94-V0, 060" rating | V-0 | V-1 | V-1 | V-0 | V-1 | V-1 |
| UL94-5V, .125" rating (bars only) | 5-V | 5-V | 5-V | 5-V | 5-V | 5-V |
| Melt Viscosity @400° F. |  |  |  |  |  |  |
| 100/sec. | 11586 | 11080 | 11262 | 10892 | 10961 | 10830 |
| 500/sec. | 4005 | 4080 | 3985 | 3979 | 3975 | 4028 |
| 1000/sec. | 2534 | 2653 | 2547 | 2579 | 2569 | 2631 |

TABLE 5

|   | G | H | 10 |
|---|---|---|---|
| SAN 1 | 58.6 | → | → |
| ABS 4 | 41.4 | → | → |
| TBBP-A | 22 | → | → |
| Sb2O3 | 6 | → | → |
| PTFE powder | 0.05 | → | |
| 10% PTFE/SAN | | | 0.5 |
| Gardner Dart Impact | | | |
| M.F.E. | 7.67 | 6.20 | 14.20 |
| St. Dev. | 1.53 | 1.52 | 5.41 |

Examples A–H are comparative examples which do not use a preblend, but rather use a direct addition of the PTFE powder. Examples 1–10 illustrate the present invention, and utilize a preblend of PTFE powder and thermoplastic resin. SAN is a styreneacrylonitrile copolymer. 3% PTFE/ABS2 means a preblend containing 3 percent by weight PTFE powder and 97 percent by weight ABS2. 3% PTFE/HRG means a preblend containing 3 percent by weight PTFE and 97 percent by weight HRG. 5% PTFE/HRG means a preblend containing 5 percent by weight PTFE and 95 percent by weight HRG. 10% PTFE/HRG means a preblend containing 10 percent by weight PTFE and 90 percent by weight HRG.

The tetrafluoroethylene polymer powders are preferably in a number average particle size range of from 100 microns to 500 microns, and the tetrafluoroethylene polymer latex preferably has a number average particle size range of from 0.2 to 1 micron.

We claim:

1. A process for making a flame retardant thermoplastic composition, comprising:
   (a) blending (i) a first thermoplastic resin, said first thermoplastic resin comprising a vinyl aromatic resin and being in dry particulate form, and (ii) a tetrafluoroethylene polymer, said tetrafluoroethylene polymer being in the form of a powder or in the form of a latex, to form a preblend comprising from 50 to 99.99 percent by weight of the first thermoplastic resin and from 0.01 to 50 weight percent of the tetrafluoroethylene polymer; and
   (b) admixing the preblend with a second thermoplastic resin, said second thermoplastic resin comprising a vinyl aromatic resin, in a preblend: resin weight ratio of between 1:1 and 1:500 and a flame retardant to form the flame retardant thermoplastic composition.

2. The process of claim 1, wherein the tetrafluoroethylene polymer is in dry particulate form and the blending comprises blending dry particles of the first thermoplastic resin with dry particles of the tetrafluoroethylene resin.

3. The process of claim 1, wherein the tetrafluoroethylene resin is in the form of a latex and the blending comprises spraying a latex of the tetrafluoroethylene polymer onto dry particles of the first thermoplastic polymer and drying the latex and wherein the preblend is in the form of dry tetrafluoroethylene polymer coated on particles of the first thermoplastic resin.

4. The process of claim 1, wherein the tetrafluoroethylene resin is in the form of a latex and the blending comprises blending the latex with dry particles of the first thermoplastic polymer and wherein the preblend contains less than 10 weight percent water.

5. The process of claim 1, wherein the first thermoplastic resin comprises a rubber modified monovinylidene aromatic graft copolymer selected from the group consisting of acrylonitrile-butadiene-styrene, acrylonitrile-butadiene-butyl acrylate, methyl methacrylate-acrylonitrile-butadiene-styrene and acrylonitrile-ethylene-propylene-non-conjugated diene-styrene copolymers.

6. The process of claim 1, wherein the first thermoplastic resin further comprises an ungrafted rigid copolymer derived from one or more monomers selected from the group consisting of styrene, α-methyl styrene, methyl acrylate, methyl methacrylate, acrylonitrile, methacrylonitrile, maleic acid anhydride, vinyl acetate and mixtures thereof.

7. The process of claim 1, wherein the thermoplastic composition comprises from 5 to 40 weight percent of the flame retardant, based on the total weight thermoplastic composition.

8. The process of claim 1, wherein the flame retardant comprises a flame proofing additive selected from the group consisting of tetrabromobisphenol A, octabromodiphenyl ether, decabromodiphenyl ether, tribromophenol, tetrabromophthalimide, tribromophenoxymethane, bis(tribromophenoxy)ethane, tris(tribromophenyl) triphosphate, trichlorotetrabromotoluene and hexabromocyclododecane.

9. The process of claim 1, wherein the flame retardant comprises a flame retardant synergist selected from the group consisting of $Sb_2O_3$, $Sb_2(CO_3)_3$, $Bi_2(CO_3)_3$.

10. A flame retardant thermoplastic composition made by the process of claim 1.

11. An article made by molding a flame retardant thermoplastic composition made by the process of claim 1.

12. The process of claim 1, wherein flame retardant thermoplastic composition comprises from 50 to 98 percent by weight of the combined first and second thermoplastic resins, based on the total weight of the flame retardant thermoplastic composition.

13. The process of claim 1, wherein flame retardant thermoplastic composition comprises from 5 to 40 percent by weight of the flame retardant additive, based on the total weight of the flame retardant thermoplastic composition.

* * * * *